(12) United States Patent
Yamada (10) Patent No.: US 10,375,277 B2
(45) Date of Patent: Aug. 6, 2019

(54) IMAGE PROCESSING APPARATUS, METHOD, AND STORAGE MEDIUM USING COLOR-ADJUSTED IMAGE DATA

(71) Applicant: CANON KABUSHIKI KAISHA, Tokyo (JP)

(72) Inventor: Michihiko Yamada, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/608,654

(22) Filed: May 30, 2017

(65) Prior Publication Data

US 2017/0353627 A1 Dec. 7, 2017

(30) Foreign Application Priority Data

Jun. 2, 2016 (JP) .................................. 2016-111362

(51) Int. Cl.
| | |
|---|---|
| *H04N 1/60* | (2006.01) |
| *G03G 15/01* | (2006.01) |
| *G06F 16/22* | (2019.01) |
| *G06T 5/20* | (2006.01) |
| *G06F 16/51* | (2019.01) |

(52) U.S. Cl.
CPC ......... *H04N 1/603* (2013.01); *G03G 15/0131* (2013.01); *G06F 16/2255* (2019.01); *G06F 16/51* (2019.01); *G06T 5/20* (2013.01)

(58) Field of Classification Search
CPC combination set(s) only.
See application file for complete search history.

(56) References Cited

U.S. PATENT DOCUMENTS

| | | | |
|---|---|---|---|
| 2010/0310160 A1* | 12/2010 | Nakajima | ............ H04N 1/6019 382/162 |
| 2013/0286040 A1* | 10/2013 | Kawaguchi | .............. H04N 1/60 345/601 |
| 2014/0043628 A1* | 2/2014 | Kishino | ............. G06K 15/1878 358/1.9 |

FOREIGN PATENT DOCUMENTS

JP 2010-288250 A 12/2010

* cited by examiner

*Primary Examiner* — Helen Zong
(74) *Attorney, Agent, or Firm* — Canon U.S.A., Inc. IP Division (57) ABSTRACT

An image processing apparatus includes an adjustment unit, an acquisition unit, and a forming unit. The adjustment unit is configured to adjust an output value corresponding to an input value including a predetermined value in a first lookup table storing the output value corresponding to the input value. The acquisition unit is configured to acquire a second lookup table by adjusting the first lookup table through adjustment of the output value by the adjustment unit. The forming unit is configured to form an image using color-adjusted image data generated by performing color adjustment on image data to be processed using a color conversion table generated based on the second lookup table acquired by the acquisition unit.

9 Claims, 9 Drawing Sheets

| No. | LATTICE POINT POSITION | | | OUTPUT VALUE | | |
|---|---|---|---|---|---|---|
| | R | G | B | R | G | B |
| 0 | 0 | 0 | 0 | 0 | 0 | 0 |
| 1 | 0 | 0 | 1 | 0 | 0 | 17 |
| 2 | 0 | 0 | 2 | 0 | 0 | 34 |
| 3 | 0 | 0 | 3 | 0 | 0 | 51 |
| 4 | 0 | 0 | 4 | 0 | 0 | 68 |
| 5 | 0 | 0 | 5 | 0 | 0 | 85 |
| 6 | 0 | 0 | 6 | 0 | 0 | 102 |
| 7 | 0 | 0 | 7 | 0 | 0 | 119 |
| 8 | 0 | 0 | 8 | 0 | 0 | 136 |
| 9 | 0 | 0 | 9 | 0 | 0 | 153 |
| 10 | 0 | 0 | 10 | 0 | 0 | 170 |
| 11 | 0 | 0 | 11 | 0 | 0 | 187 |
| 12 | 0 | 0 | 12 | 0 | 0 | 204 |
| 13 | 0 | 0 | 13 | 0 | 0 | 221 |
| 14 | 0 | 0 | 14 | 0 | 0 | 238 |
| 15 | 0 | 0 | 15 | 0 | 0 | 255 |
| 16 | 0 | 1 | 0 | 0 | 17 | 0 |
| 17 | 0 | 1 | 1 | 0 | 17 | 17 |
| 18 | 0 | 1 | 2 | 0 | 17 | 34 |
| ⋮ | ⋮ | ⋮ | ⋮ | ⋮ | ⋮ | ⋮ |
| 3968 | 15 | 8 | 0 | 255 | 136 | 0 |
| 3969 | 15 | 8 | 1 | 255 | 136 | 17 |
| 3970 | 15 | 8 | 2 | 255 | 136 | 34 |
| 3971 | 15 | 8 | 3 | 255 | 136 | 51 |
| 3972 | 15 | 8 | 4 | 255 | 136 | 68 |
| 3973 | 15 | 8 | 5 | 255 | 136 | 85 |
| 3974 | 15 | 8 | 6 | 255 | 136 | 102 |
| 3975 | 15 | 8 | 7 | 255 | 136 | 119 |
| 3976 | 15 | 8 | 8 | 255 | 136 | 136 |
| 3977 | 15 | 8 | 9 | 255 | 136 | 153 |
| 3978 | 15 | 8 | 10 | 255 | 136 | 170 |
| ⋮ | ⋮ | ⋮ | ⋮ | ⋮ | ⋮ | ⋮ |
| 4090 | 15 | 15 | 10 | 255 | 255 | 170 |
| 4091 | 15 | 15 | 11 | 255 | 255 | 187 |
| 4092 | 15 | 15 | 12 | 255 | 255 | 204 |
| 4093 | 15 | 15 | 13 | 255 | 255 | 221 |
| 4094 | 15 | 15 | 14 | 255 | 255 | 238 |
| 4095 | 15 | 15 | 15 | 255 | 255 | 255 |

FIG.5B 502

| No. | LATTICE POINT POSITION | | | OUTPUT VALUE | | |
|---|---|---|---|---|---|---|
| | R | G | B | R | G | B |
| 0 | 0 | 0 | 0 | 0 | 0 | 0 |
| 1 | 0 | 0 | 1 | 0 | 0 | 17 |
| 2 | 0 | 0 | 2 | 0 | 0 | 34 |
| 3 | 0 | 0 | 3 | 0 | 0 | 51 |
| 4 | 0 | 0 | 4 | 0 | 0 | 68 |
| 5 | 0 | 0 | 5 | 0 | 0 | 85 |
| 6 | 0 | 0 | 6 | 0 | 0 | 102 |
| 7 | 0 | 0 | 7 | 0 | 0 | 119 |
| 8 | 0 | 0 | 8 | 0 | 0 | 136 |
| 9 | 0 | 0 | 9 | 0 | 0 | 153 |
| 10 | 0 | 0 | 10 | 0 | 0 | 170 |
| 11 | 0 | 0 | 11 | 0 | 0 | 187 |
| 12 | 0 | 0 | 12 | 0 | 0 | 204 |
| 13 | 0 | 0 | 13 | 0 | 0 | 221 |
| 14 | 0 | 0 | 14 | 0 | 0 | 238 |
| 15 | 0 | 0 | 15 | 0 | 0 | 255 |
| 16 | 0 | 1 | 0 | 0 | 17 | 0 |
| 17 | 0 | 1 | 1 | 0 | 17 | 17 |
| 18 | 0 | 1 | 2 | 0 | 17 | 34 |
| ⋮ | ⋮ | ⋮ | ⋮ | ⋮ | ⋮ | ⋮ |
| 3968 | 15 | 8 | 0 | 255 | 124 | 0 |
| 3969 | 15 | 8 | 1 | 255 | 128 | 13 |
| 3970 | 15 | 8 | 2 | 255 | 132 | 31 |
| 3971 | 15 | 8 | 3 | 255 | 136 | 51 |
| 3972 | 15 | 8 | 4 | 255 | 136 | 68 |
| 3973 | 15 | 8 | 5 | 255 | 136 | 85 |
| 3974 | 15 | 8 | 6 | 255 | 132 | 97 |
| 3975 | 15 | 8 | 7 | 255 | 128 | 110 |
| 3976 | 15 | 8 | 8 | 255 | 124 | 124 |
| 3977 | 15 | 8 | 9 | 255 | 128 | 145 |
| 3978 | 15 | 8 | 10 | 255 | 132 | 160 |
| ⋮ | ⋮ | ⋮ | ⋮ | ⋮ | ⋮ | ⋮ |
| 4090 | 15 | 15 | 10 | 255 | 255 | 170 |
| 4091 | 15 | 15 | 11 | 255 | 255 | 187 |
| 4092 | 15 | 15 | 12 | 255 | 255 | 204 |
| 4093 | 15 | 15 | 13 | 255 | 255 | 221 |
| 4094 | 15 | 15 | 14 | 255 | 255 | 238 |
| 4095 | 15 | 15 | 15 | 255 | 255 | 255 |

FIG.6

| | | \multicolumn{16}{c}{LATTICE POINT POSITION 1} |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| LATTICE POINT POSITION 2 | 0 | 0 | 0 | 0 | 0 | 0 | 0 | 0 | 0 | 0 | 0 | 0 | 0 | 0 | 0 | 0 | 0 |
| | 1 | 0 | 0 | 1 | 1 | 1 | 1 | 1 | 1 | 1 | 1 | 1 | 1 | 1 | 1 | 2 | 3 |
| | 2 | 0 | 1 | 0 | 1 | 2 | 2 | 2 | 2 | 2 | 2 | 2 | 2 | 2 | 2 | 3 | 3 |
| | 3 | 0 | 1 | 1 | 0 | 1 | 2 | 3 | 3 | 3 | 3 | 3 | 3 | 3 | 3 | 3 | 3 |
| | 4 | 0 | 1 | 2 | 1 | 0 | 1 | 2 | 3 | 3 | 3 | 3 | 3 | 3 | 3 | 3 | 3 |
| | 5 | 0 | 1 | 2 | 2 | 1 | 0 | 1 | 2 | 3 | 3 | 3 | 3 | 3 | 3 | 3 | 3 |
| | 6 | 0 | 1 | 2 | 3 | 2 | 1 | 0 | 1 | 2 | 3 | 3 | 3 | 3 | 3 | 3 | 3 |
| | 7 | 0 | 1 | 2 | 3 | 3 | 2 | 1 | 0 | 1 | 2 | 3 | 3 | 3 | 3 | 3 | 3 |
| | 8 | 0 | 1 | 2 | 3 | 3 | 3 | 2 | 1 | 0 | 1 | 2 | 3 | 3 | 3 | 3 | 3 |
| | 9 | 0 | 1 | 2 | 3 | 3 | 3 | 3 | 2 | 1 | 0 | 1 | 2 | 3 | 3 | 3 | 3 |
| | 10 | 0 | 1 | 2 | 3 | 3 | 3 | 3 | 3 | 2 | 1 | 0 | 1 | 2 | 3 | 3 | 3 |
| | 11 | 0 | 1 | 2 | 3 | 3 | 3 | 3 | 3 | 3 | 2 | 1 | 0 | 1 | 2 | 3 | 3 |
| | 12 | 0 | 1 | 2 | 3 | 3 | 3 | 3 | 3 | 3 | 3 | 2 | 1 | 0 | 1 | 3 | 3 |
| | 13 | 0 | 1 | 2 | 3 | 3 | 3 | 3 | 3 | 3 | 3 | 3 | 2 | 1 | 0 | 2 | 3 |
| | 14 | 0 | 2 | 3 | 3 | 3 | 3 | 3 | 3 | 3 | 3 | 3 | 3 | 3 | 2 | 0 | 3 |
| | 15 | 0 | 3 | 3 | 3 | 3 | 3 | 3 | 3 | 3 | 3 | 3 | 3 | 3 | 3 | 3 | 0 |

|  |  | ADJUSTMENT SETTING VALUE | | | | |
|---|---|---|---|---|---|---|
|  |  | -2 | -1 | 0 | 1 | 2 |
| ADJUSTMENT AMOUNT | 0 | 0.850 | 0.925 | 1.000 | 1.075 | 1.150 |
|  | 1 | 0.900 | 0.950 | 1.000 | 1.050 | 1.100 |
|  | 2 | 0.950 | 0.975 | 1.000 | 1.025 | 1.050 |
|  | 3 | 1.000 | 1.000 | 1.000 | 1.000 | 1.000 |

| No. | LATTICE POINT POSITION | | | OUTPUT VALUE | | | |
|---|---|---|---|---|---|---|---|
| | R | G | B | C | M | Y | K |
| 0 | 0 | 0 | 0 | 98 | 78 | 118 | 255 |
| 1 | 0 | 0 | 1 | 114 | 96 | 110 | 222 |
| 2 | 0 | 0 | 2 | 128 | 113 | 102 | 192 |
| 3 | 0 | 0 | 3 | 143 | 129 | 94 | 163 |
| 4 | 0 | 0 | 4 | 156 | 144 | 87 | 137 |
| 5 | 0 | 0 | 5 | 168 | 158 | 79 | 113 |
| 6 | 0 | 0 | 6 | 180 | 171 | 71 | 92 |
| 7 | 0 | 0 | 7 | 191 | 184 | 63 | 73 |
| 8 | 0 | 0 | 8 | 200 | 195 | 55 | 56 |
| 9 | 0 | 0 | 9 | 209 | 205 | 47 | 41 |
| 10 | 0 | 0 | 10 | 217 | 214 | 39 | 28 |
| 11 | 0 | 0 | 11 | 224 | 222 | 31 | 18 |
| 12 | 0 | 0 | 12 | 230 | 229 | 24 | 10 |
| 13 | 0 | 0 | 13 | 234 | 234 | 16 | 5 |
| 14 | 0 | 0 | 14 | 238 | 237 | 8 | 1 |
| 15 | 0 | 0 | 15 | 239 | 239 | 0 | 0 |
| 16 | 0 | 1 | 0 | 98 | 78 | 118 | 255 |
| 17 | 0 | 1 | 1 | 114 | 96 | 110 | 222 |
| 18 | 0 | 1 | 2 | 128 | 113 | 102 | 192 |
| ⋮ | ⋮ | ⋮ | ⋮ | ⋮ | ⋮ | ⋮ | ⋮ |
| 3968 | 15 | 8 | 0 | 0 | 111 | 247 | 0 |
| 3969 | 15 | 8 | 1 | 0 | 111 | 230 | 0 |
| 3970 | 15 | 8 | 2 | 0 | 110 | 212 | 0 |
| 3971 | 15 | 8 | 3 | 0 | 110 | 195 | 0 |
| 3972 | 15 | 8 | 4 | 0 | 110 | 178 | 0 |
| 3973 | 15 | 8 | 5 | 0 | 110 | 161 | 0 |
| 3974 | 15 | 8 | 6 | 0 | 110 | 144 | 0 |
| 3975 | 15 | 8 | 7 | 0 | 110 | 127 | 0 |
| 3976 | 15 | 8 | 8 | 0 | 111 | 111 | 0 |
| 3977 | 15 | 8 | 9 | 0 | 112 | 95 | 0 |
| 3978 | 15 | 8 | 10 | 0 | 113 | 79 | 0 |
| ⋮ | ⋮ | ⋮ | ⋮ | ⋮ | ⋮ | ⋮ | ⋮ |
| 4090 | 15 | 15 | 10 | 0 | 0 | 85 | 0 |
| 4091 | 15 | 15 | 11 | 0 | 0 | 68 | 0 |
| 4092 | 15 | 15 | 12 | 0 | 0 | 51 | 0 |
| 4093 | 15 | 15 | 13 | 0 | 0 | 34 | 0 |
| 4094 | 15 | 15 | 14 | 0 | 0 | 17 | 0 |
| 4095 | 15 | 15 | 15 | 0 | 0 | 0 | 0 |

FIG.9B 902

| No. | LATTICE POINT POSITION | | | OUTPUT VALUE | | | |
|---|---|---|---|---|---|---|---|
| | R | G | B | C | M | Y | K |
| 0 | 0 | 0 | 0 | 98 | 78 | 118 | 255 |
| 1 | 0 | 0 | 1 | 114 | 96 | 110 | 222 |
| 2 | 0 | 0 | 2 | 128 | 113 | 102 | 192 |
| 3 | 0 | 0 | 3 | 143 | 129 | 94 | 163 |
| 4 | 0 | 0 | 4 | 156 | 144 | 87 | 137 |
| 5 | 0 | 0 | 5 | 168 | 158 | 79 | 113 |
| 6 | 0 | 0 | 6 | 180 | 171 | 71 | 92 |
| 7 | 0 | 0 | 7 | 191 | 184 | 63 | 73 |
| 8 | 0 | 0 | 8 | 200 | 195 | 55 | 56 |
| 9 | 0 | 0 | 9 | 209 | 205 | 47 | 41 |
| 10 | 0 | 0 | 10 | 217 | 214 | 39 | 28 |
| 11 | 0 | 0 | 11 | 224 | 222 | 31 | 18 |
| 12 | 0 | 0 | 12 | 230 | 229 | 24 | 10 |
| 13 | 0 | 0 | 13 | 234 | 234 | 16 | 5 |
| 14 | 0 | 0 | 14 | 238 | 237 | 8 | 1 |
| 15 | 0 | 0 | 15 | 239 | 239 | 0 | 0 |
| 16 | 0 | 1 | 0 | 98 | 78 | 118 | 255 |
| 17 | 0 | 1 | 1 | 114 | 96 | 110 | 222 |
| 18 | 0 | 1 | 2 | 128 | 113 | 102 | 192 |
| ⋮ | ⋮ | ⋮ | ⋮ | ⋮ | ⋮ | ⋮ | ⋮ |
| 3968 | 15 | 8 | 0 | 0 | 122 | 246 | 0 |
| 3969 | 15 | 8 | 1 | 0 | 118 | 233 | 0 |
| 3970 | 15 | 8 | 2 | 0 | 114 | 215 | 0 |
| 3971 | 15 | 8 | 3 | 0 | 110 | 195 | 0 |
| 3972 | 15 | 8 | 4 | 0 | 110 | 178 | 0 |
| 3973 | 15 | 8 | 5 | 0 | 110 | 161 | 0 |
| 3974 | 15 | 8 | 6 | 0 | 110 | 149 | 0 |
| 3975 | 15 | 8 | 7 | 0 | 110 | 136 | 0 |
| 3976 | 15 | 8 | 8 | 0 | 111 | 122 | 0 |
| 3977 | 15 | 8 | 9 | 0 | 112 | 102 | 0 |
| 3978 | 15 | 8 | 10 | 0 | 113 | 88 | 0 |
| ⋮ | ⋮ | ⋮ | ⋮ | ⋮ | ⋮ | ⋮ | ⋮ |
| 4090 | 15 | 15 | 10 | 0 | 0 | 85 | 0 |
| 4091 | 15 | 15 | 11 | 0 | 0 | 68 | 0 |
| 4092 | 15 | 15 | 12 | 0 | 0 | 51 | 0 |
| 4093 | 15 | 15 | 13 | 0 | 0 | 34 | 0 |
| 4094 | 15 | 15 | 14 | 0 | 0 | 17 | 0 |
| 4095 | 15 | 15 | 15 | 0 | 0 | 0 | 0 |

IMAGE PROCESSING APPARATUS, METHOD, AND STORAGE MEDIUM USING COLOR-ADJUSTED IMAGE DATA

BACKGROUND OF THE INVENTION

Field of the Invention

One disclosed aspect of the embodiments relates to an image processing apparatus. In particular, an embodiment is related to color adjustment.

Description of the Related Art

In printing data that includes thin lines such as characters and lines, line widths are sometimes unstable. For example, the line widths can be decreased, or the lines can be lightened. This makes it difficult to discriminate between the lines. Further, the line widths can be increased, or the lines can be darkened. This causes small-point characters including lines to become illegible.

In conventional color adjustment processing on characters and lines, an attribute of data received from an application is referenced, and color processing selected based on the referenced attribute is performed. Specifically, a method is discussed in which normal color processing is performed on data that includes an attribute of an image while color adjustment processing is performed to enhance or lighten colors on data that includes an attribute of a character or line (Japanese Patent Application Laid-Open No. 2010-288250).

However, recent applications are capable of producing more advanced representations, and shadows and borders are added to characters and graphics produced by the applications. Consequently, the characters are more likely to be converted into images in the applications and transmitted as image data to a color processing unit. This often makes it difficult to distinguish between characters and images, making it difficult to change color adjustment based on attributes.

SUMMARY OF THE INVENTION

According to an aspect of the embodiments, an image processing apparatus includes an adjustment unit configured to adjust an output value corresponding to an input value including a predetermined value in a first lookup table storing the output value corresponding to the input value, an acquisition unit configured to acquire a second lookup table by adjusting the first lookup table through adjustment of the output value by the adjustment unit, and a forming unit configured to form an image using color-adjusted image data generated by performing color adjustment on image data to be processed using a color conversion table generated based on the second lookup table acquired by the acquisition unit.

Further features of the disclosure will become apparent from the following description of exemplary embodiments with reference to the attached drawings.

BRIEF DESCRIPTION OF THE DRAWINGS

FIGS. 5A and 5B respectively illustrate a through 3D LUT and an adjustment 3D LUT according to the exemplary embodiment.

FIGS. 9A and 9B respectively illustrate a color conversion 3D LUT and a combination 3D LUT according to the exemplary embodiment.

DESCRIPTION OF THE EMBODIMENTS

An exemplary embodiment of the disclosure will be described in detail below with reference to the drawings. It should be understood that the exemplary embodiment described below is not intended to limit the scope of the claimed disclosure and not every combination of features described in the exemplary embodiment is essential for a technical solution of the disclosure.

An exemplary embodiment will be described below with reference to FIG. 1. The present exemplary embodiment is applicable to mono-color and multi-color electrophotographic image formation apparatuses such as copying machines, multi-function peripherals (MFPs), laser printers, and facsimile apparatuses. In the exemplary embodiment, an MFP including a scan function, a printing function, a copy function, a transmission function, etc. will be described as an example of an image formation apparatus to which the present exemplary embodiment is applied. Further, the MFP is capable of forming multicolor images with developing agents (toner) of a plurality of colors (four colors including cyan, magenta, yellow, and black (CMYK)) on recording materials.

<Hardware Configuration of Image Formation Apparatus>

Figure 1:
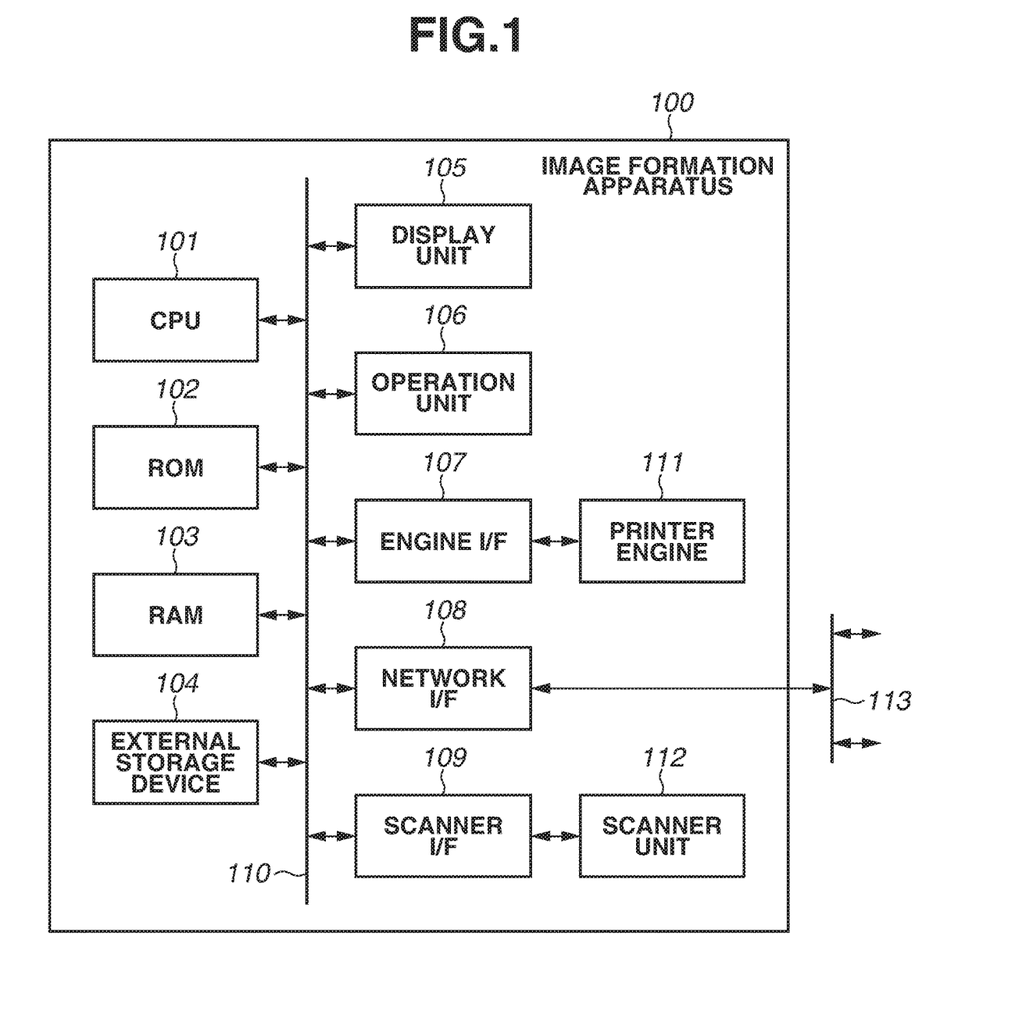
FIG. 1 is a block diagram illustrating a system configuration of an image formation apparatus according to an exemplary embodiment.

FIG. 1 is a block diagram illustrating a hardware configuration of an image formation apparatus 100 according to the exemplary embodiment. The image formation apparatus 100 includes a central processing unit (CPU) 101, a read-only memory (ROM) 102, a random access memory (RAM) 103, an external storage device 104, a display unit 105, an operation unit 106, an engine interface (I/F) 107, a network I/F 108, and a scanner I/F 109, all of which are connected to each other via a system bus 110. The image formation apparatus 100 further includes a printer engine 111 and a scanner unit 112. The printer engine 111 and the scanner unit 112 are connected to the system bus 110 via the engine I/F 107 and the scanner I/F 109, respectively.

The CPU 101 controls operations of the entire image formation apparatus 100. The CPU 101 reads a program stored in the ROM 102 into the RAM 103 and executes the program to execute various types of processing described below. The ROM 102 is a read-only memory and stores a system boot program, a program for controlling the printer engine 111, character data information, character code information, etc. The RAM 103 is a volatile random access memory, and is used as a work area of the CPU 101 and a temporary storage area for various data. For example, the RAM 103 is used as a storage area for storing font data downloaded and registered additionally, images files received from external devices, etc. The external storage device 104 includes, for example, a hard disk, and various data are spooled. The external storage device 104 is used as a storage area for storing programs, information files, image data, etc., or as a work area.

The display unit 105 includes, for example, a liquid crystal display (hereinafter, "LCD") and is used to display a setting state of the image formation apparatus 100, a status of processing being executed, an error state, etc. The operation unit 106 includes an input device, such as hard keys and a touch panel provided on the display unit 105, and accepts input (instruction) by a user operation. The operation unit 106 is used to change settings of the image formation apparatus 100, and reset the settings. The operation unit 106 is also used to set an operation mode (printing mode) of the image formation apparatus 100 to execute image forming (printing).

The engine I/F 107 is used as an interface for controlling the printer engine 111 according to an instruction from the CPU 101 to execute printing. Engine control commands and the like are transmitted and received between the CPU 101 and the printer engine 111 via the engine I/F 107. The network I/F 108 functions as an interface for connecting the image formation apparatus 100 to a network 113. The network 113 can be, for example, a local area network (LAN) or public switched telephone network (PSTN). The printer engine 111 forms (prints) an image on a recording material such as a sheet based on image data received from the system bus 110 according to the control by the CPU 101. The printer engine 111 includes a fixing device (fixing unit) configured to thermally fix onto a recording material a toner image transferred onto the recording material. The fixing device includes a heating unit (heater) configured to heat the recording material, and the temperature (fixing temperature) of the heater during the fixing of the image onto the recording material is controlled by the CPU 101.

The scanner I/F 109 functions as an interface for controlling the scanner unit 112 according to an instruction from the CPU 101 to read a document by the scanner unit 112. Scanner unit control commands and the like are transmitted and received between the CPU 101 and the scanner unit 112 via the scanner I/F 109. The scanner unit 112 reads an image of a document, generates image data, and transmits the image data to the RAM 103 or the external storage device 104 via the scanner I/F 109 according to the control by the CPU 101.

<Functional Configuration of Image Formation Apparatus>

Figure 2:
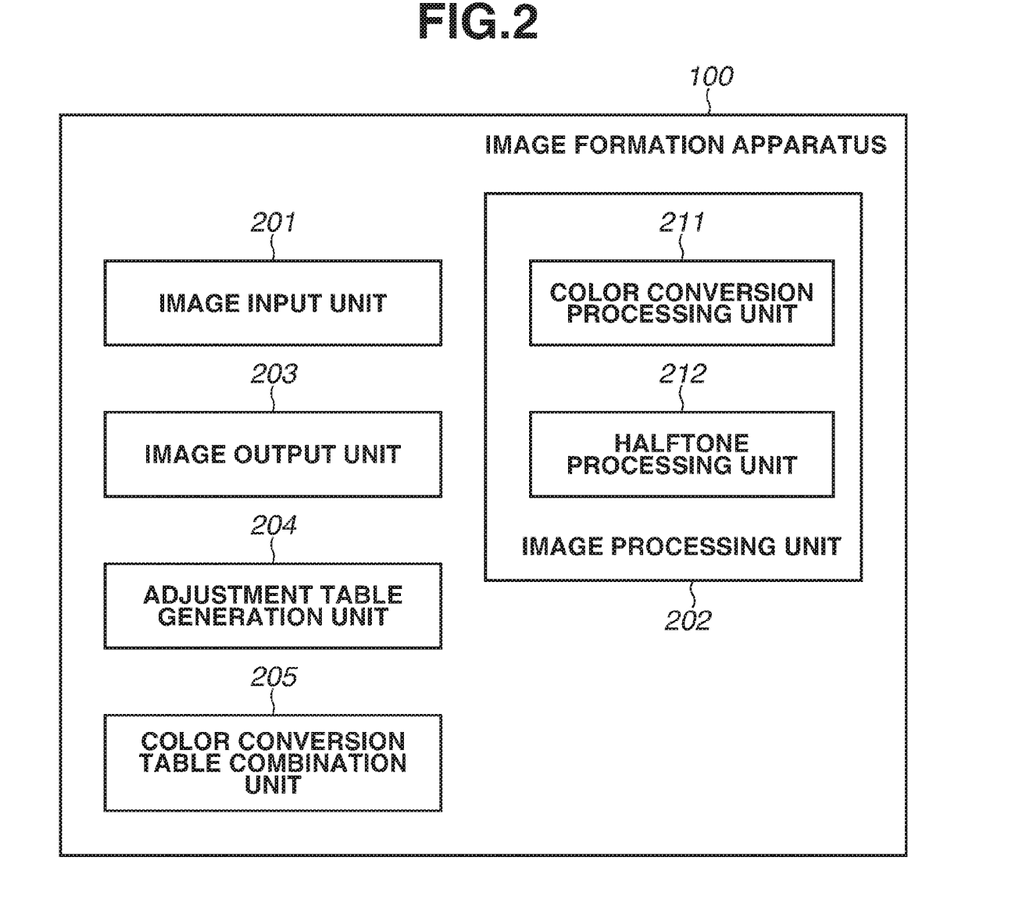
FIG. 2 illustrates a functional configuration of the image formation apparatus according to the exemplary embodiment.

FIG. 2 is a block diagram illustrating a functional configuration of the image formation apparatus 100. The image formation apparatus 100 includes, as a functional configuration, an image input unit 201, an image processing unit 202, an image output unit 203, an adjustment table generation unit 204, and a color conversion table combination unit 205. The CPU 101 reads a program stored in the ROM 102 into the RAM 103 and executes the program to realize the above-described functional units on the image formation apparatus 100.

The image input unit 201 accepts input of image data to the image formation apparatus 100. The image data can be input from an external apparatus such as a personal computer (PC) via the network 113 and the network I/F 108, or image data generated by the scanner unit 112 can be input via the scanner I/F 109. Examples of image data to be input include a bitmap image. The image input unit 201 stores image data accepted as input in the RAM 103 or the external storage device 104.

The adjustment table generation unit 204 accepts user settings from the display unit 105, and generates an adjustment three-dimensional (3D) lookup table (LUT) based on the settings. In the adjustment 3D LUT, input colors are colors of a red-green-blue (RGB) color space, and output colors are colors of the RGB color space. A through 3D LUT, which is an original RGB-input RGB-output LUT to be adjusted and in which signal values do not change, is stored in the external storage device 104 or the ROM 102, and the adjusted adjustment 3D LUT is stored in the RAM 103 or the external storage device 104.

The color conversion table combination unit 205 generates a combination 3D LUT by combining the RGB-input RGB-output adjustment 3D LUT generated by the adjustment table generation unit 204 and an RGB-input CMYK-output color conversion 3D LUT stored in the external storage device 104 or the ROM 102. The generated combination 3D LUT is stored in the RAM 103 or the external storage device 104.

The image processing unit 202 executes image processing, such as color conversion processing and halftone processing, on the input image data. In this way, the image processing unit 202 converts the input image data into image data (print data) corresponding to an image that can be output (printed onto a recording material) by the image output unit 203. Specifically, the image processing unit 202 generates print data from the input image data.

The image output unit 203 receives the print data generated by the image processing unit 202, and transmits the print data as a video signal to the printer engine 111 via the engine I/F 107. In this way, the image output unit 203 controls the printer engine 111 to form an image on a recording material based on the print data generated by the image processing unit 202. The printer engine 111 executes exposure processing, development processing, transferring processing, and fixing processing to print the image on the recording material.

<Image Processing by Image Processing Unit>

As illustrated in FIG. 2, the image processing unit 202 includes a color conversion processing unit 211 and a halftone processing unit 212.

The color conversion processing unit 211 converts the input image data into suitable data for the image formation apparatus 100 using the combination 3D LUT generated by the adjustment table generation unit 204. For example, in a case where the input image data is RGB data and the image formation apparatus 100 is a multicolor printer that uses commonly-used CMYK toners, the color conversion processing unit 211 performs processing on the input image data to convert the RGB data into CMYK data.

The halftone processing unit 212 performs halftone processing on the CMYK data converted by the color conversion processing unit 211. In many cases, the printer engine 111 generally supports output with only a small number of gradations such as two, four, or sixteen gradations. Thus, the halftone processing unit 212 performs halftone processing to enable stable output with halftone representations even in the case of output with a small number of gradations. Various methods such as a density pattern method, a systematic dither method, or an error diffusion method are applicable to the halftone processing performed by the halftone processing unit 212.

Figure 3:
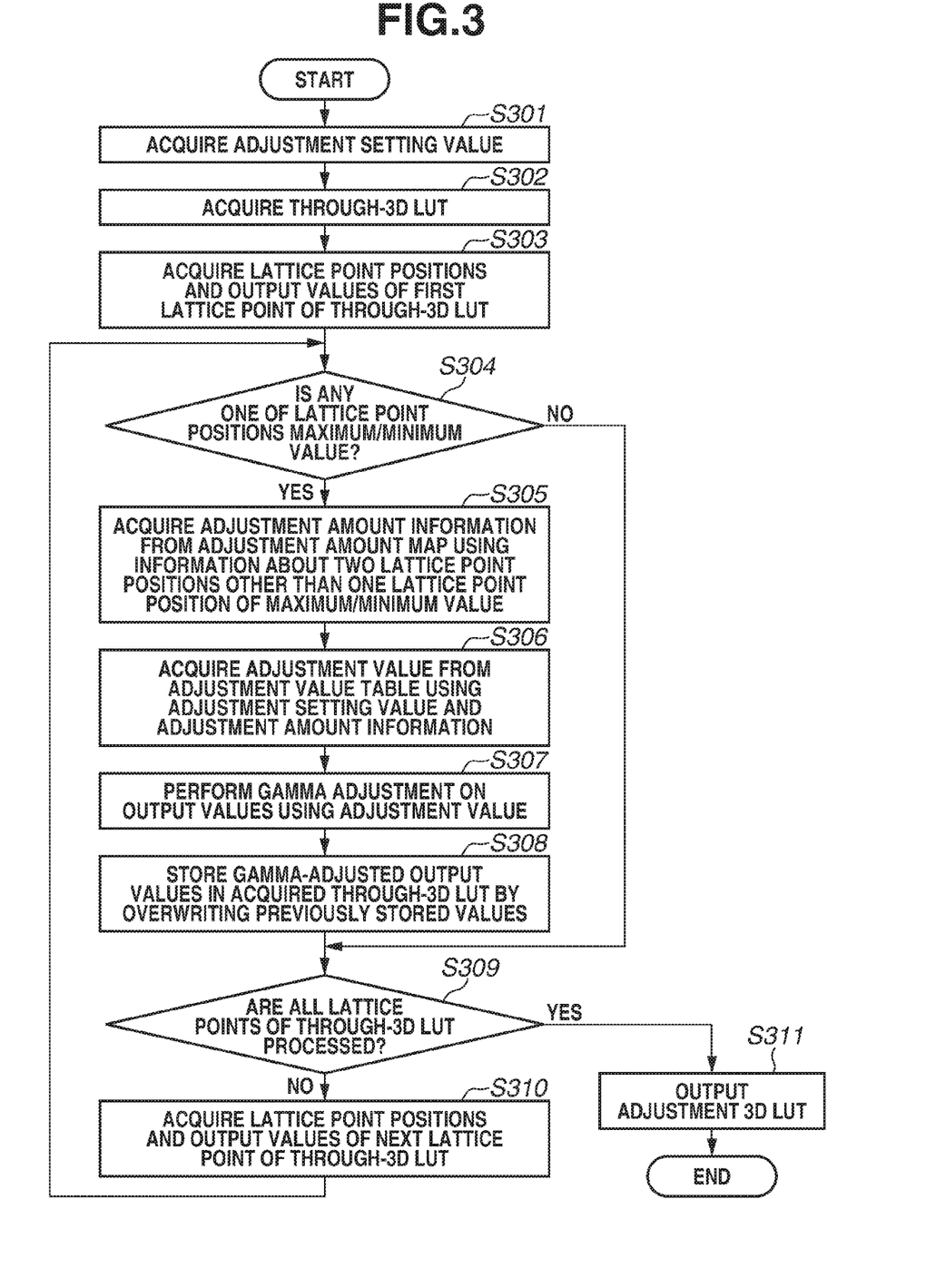
FIG. 3 is a flowchart illustrating a process of generating an adjustment three-dimensional (3D) lookup table (LUT) according to the exemplary embodiment.

FIG. 3 is a flowchart illustrating an example of a process of generating the RGB-input RGB-output adjustment 3D LUT by the adjustment table generation unit 204. The CPU 101 reads a program stored in the ROM 102 into the RAM 103 and executes the program to realize steps in the flowchart illustrated in FIG. 3 on the image formation apparatus 100.

While a 3D LUT in which input colors are colors of the RGB color space and output colors are colors of the RGB color space will be described below, the present exemplary embodiment is not limited to the described 3D LUT, and a two- or higher-dimensional LUT can be used.

Figure 4:
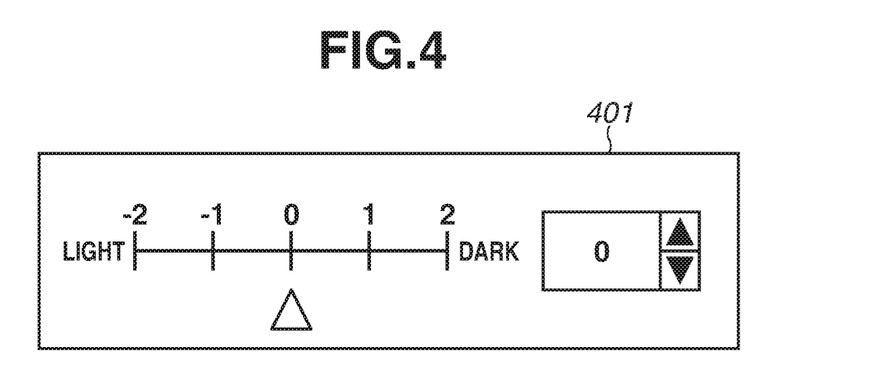
FIG. 4 illustrates a setting value selection screen according to the exemplary embodiment.

If the image input unit 201 accepts input image data, then in step S301, the adjustment table generation unit 204 acquires a setting value set on a setting value selection screen 401 displayed on the display unit 105, and the processing proceeds to step S302.

FIG. 4 illustrates a setting value selection screen 401, which is an example of a screen displayed on the display unit 105. The setting value selected by a user via the setting value selection screen 401 is input.

As the value set by the user is increased toward "dark", an adjustment amount of a lattice point to be adjusted increases. Consequently, the adjustment 3D LUT is adjusted such that the adjusted image density is increased.

On the other hand, as the value set by the user is increased toward "light", the adjustment amount of a lattice point to be adjusted decreases. Consequently, the adjustment 3D LUT is adjusted such that the adjusted image density is decreased.

In step S302, the adjustment table generation unit 204 acquires an RGB-input RGB-output through 3D LUT 501, illustrated in FIG. 5A, stored in the external storage device 104 or the ROM 102 to store the acquired through 3D LUT 501 in the RAM 103, and the processing proceeds to step S303.

FIG. 5A illustrates the 3D LUT 501, which is an example of the through 3D LUT. Output values (R, G, B) corresponding to configuration values (R, G, B) of respective lattice point positions are specified. Each lattice point is given a number (No.), and some of the cases of the numbers 0 to 4095 are illustrated in FIG. 5A. In step S303, the adjustment table generation unit 204 acquires values (configuration values) corresponding to lattice point positions and output values of the first lattice point of No. 0 in the through 3D LUT 501. Then, the processing proceeds to step S304.

In step S304, the adjustment table generation unit 204 determines whether any one of the configuration values R, G, and B of the lattice point positions of the current lattice point is a maximum value "15" or a minimum value "0". If there is no maximum/minimum value (NO in step S304), the processing proceeds to step S309.

While the maximum value is 15 and the minimum value is 0 in the present exemplary embodiment, the maximum value and the minimum value can be any possible maximum and minimum values of the configuration values (R, G, B) of the lattice point (hereinafter, the maximum value or minimum value will be referred to as a "predetermined value"). On the other hand, in step S304, if the adjustment table generation unit 204 determines that one of the configuration values R, G, and B corresponding to the lattice point positions of the current lattice point is the maximum value "15" or minimum value "0" (YES in step S304), the processing proceeds to step S305.

Figure 6:
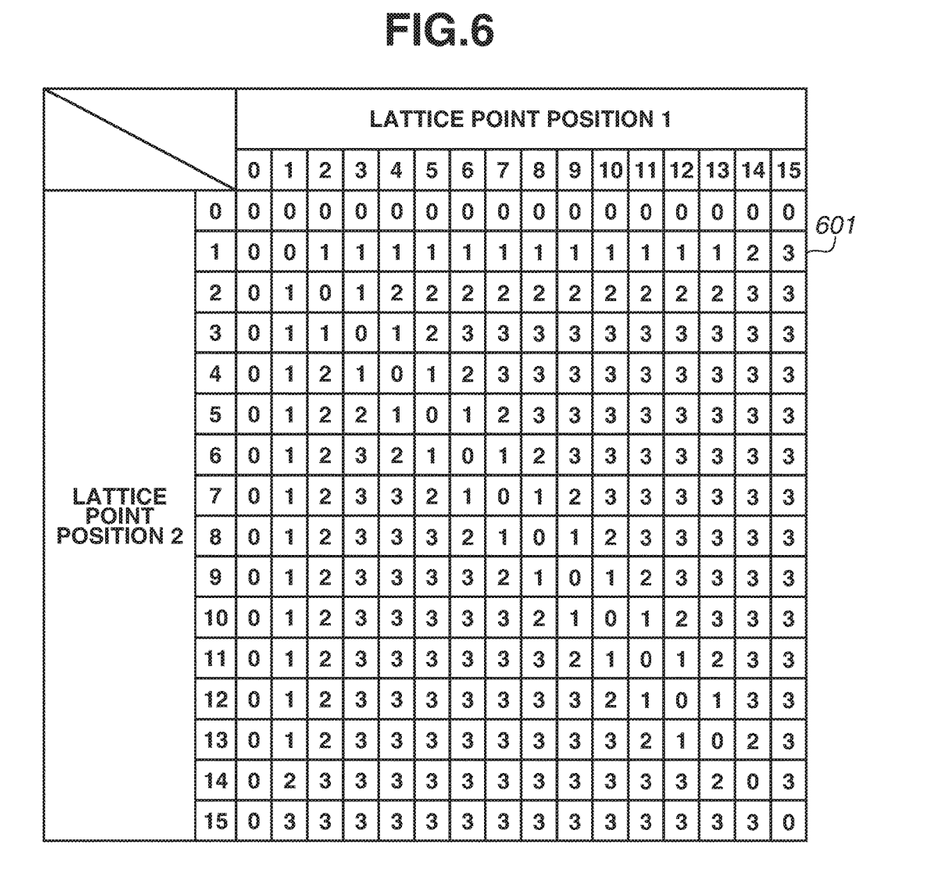
FIG. 6 illustrates an adjustment amount map according to the exemplary embodiment.

In step S305, the adjustment table generation unit 204 inputs to an adjustment amount map 601, illustrated in FIG. 6, the two configuration values other than the one configuration value that is "15" among the values (configuration values) R, G, and B corresponding to the lattice point positions of the lattice point. The adjustment table generation unit 204 respectively inputs the configuration values to the lattice point positions 1 and 2 in the adjustment amount map 601. Then, the adjustment table generation unit 204 acquires adjustment amount information, and the processing proceeds to step S306.

FIG. 6 illustrates an example of the adjustment amount map.

The adjustment amount map 601 is used to obtain the adjustment amount of the corresponding lattice point using two configuration values that are not the predetermined value (maximum value or minimum value) among the configuration values of the lattice point. The adjustment amount map 601 is stored in advance in the ROM 102.

The adjustment amount of the corresponding lattice point is a value specified at a position where a value on a horizontal axis that is the same as a first configuration value, which is one of the configuration values (first and second configuration values) other than the predetermined value (maximum value or minimum value), and a value on a vertical axis that is the same as the second configuration value, which is the other one of the configuration values other than the predetermined value, cross each other.

For example, in a case where the configuration values R, G, and B corresponding to the lattice point positions of the 3968th lattice point of the through 3D LUT 501 are "15", "8", and "0", respectively, one of the configuration values is the maximum value "15" and the other lattice point positions (configuration values) are "8" and "0". In this case, the adjustment amount information "0" is acquired from the value specified at the position where the value of the horizontal axis is 8 and the value of the vertical axis is 0 in the adjustment amount map 601. Further, in a case where, for example, the configuration values R, G, and B corresponding to the lattice point positions of the 3978th lattice point of the through 3D LUT 501 are "15", "8", and "10", respectively, one of the configuration values is the maximum value "15" and the other lattice point positions (configuration values) are "8" and "10". In this case, the adjustment amount information "2" is acquired from the value specified at the position where the value of 8 on the horizontal axis and the value of 10 on the vertical axis cross each other in the adjustment amount map 601.

In a case where two or more configuration values have the predetermined value (maximum value or minimum value), only one of the configuration values is used as the configuration value of the predetermined value (maximum value or minimum value). Then, adjustment is performed using the other configuration values. Specifically, in a case where the configuration values R, G, and B of a lattice point are "15", "15", and "10", respectively, adjustment information amount "3" is acquired from the configuration values (15 and 10) other than "15" (predetermined value) which is one of the configuration values R and G.

Figure 7:
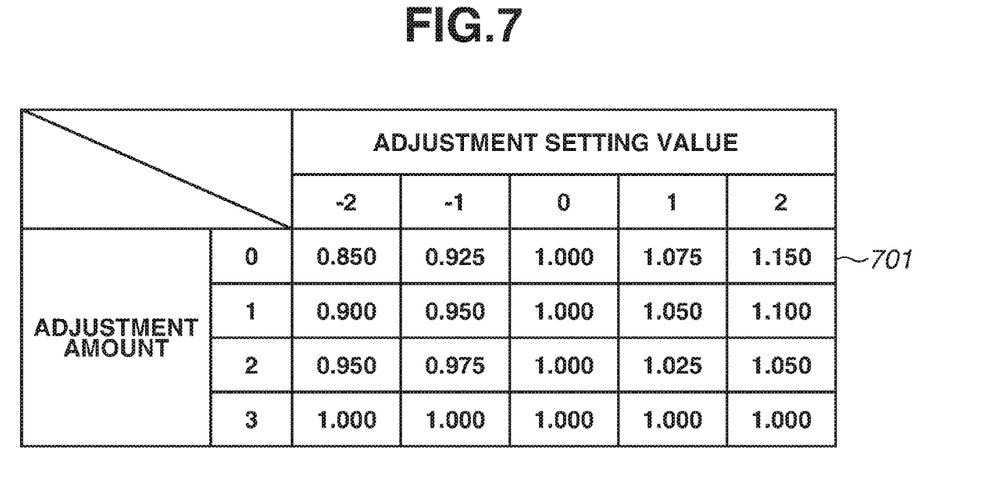
FIG. 7 illustrates an adjustment value table according to the exemplary embodiment.

In step S306, the adjustment table generation unit 204 inputs the setting value acquired in step S301 and the adjustment amount information acquired in step S306 to an adjustment value table 701 illustrated in FIG. 7 to acquire an adjustment value, and the processing proceeds to step S307.

FIG. 7 illustrates a relationship between the adjustment setting value set in FIG. 4 and the adjustment amount. The adjustment value table 701 is stored in advance in the ROM 102.

For example, in a case where "2" is selected on the setting value selection screen 401 and the adjustment amount information of the 3968th lattice point of the through 3D LUT 501 that is acquired in step S305 is "0", an adjustment value of "1.150" is acquired from the adjustment value table 701. Further, in a case where "2" is selected on the setting value selection screen 401 and the adjustment amount information of the 3978th lattice point of the through 3D LUT 501 that is acquired in step S305 is "2", an adjustment value of "1.050" is acquired from the adjustment value table 701.

In step S307, the adjustment table generation unit 204 performs gamma adjustment on each of the output values R, G, and B of the through 3D LUT 501 using the adjustment value acquired in step S306, and the processing proceeds to step S308.

For example, in a case where "2" is selected on the setting value selection screen 401 and the adjustment value of the 3968th lattice point of the through 3D LUT 501 that is acquired in step S305 is "1.150", gamma adjustment is performed to raise each of the output values R, G, and B of "255", "136", and "0", respectively, to the power of gamma 1.150. Consequently, adjusted output values R, G, and B of "255", "124", and "0" are respectively obtained. Further, in a case where "2" is selected on the setting value selection screen 401 and the adjustment value of the 3978th lattice point of the through 3D LUT 501 that is acquired in step S305 is "1.050", gamma adjustment is performed to raise each of the output values R, G, and B of "255", "136", and "170", respectively, to the power of gamma 1.050. Consequently, adjusted output values R, G, and B of "255", "132", and "160" are respectively obtained.

The gamma adjustment is expressed by the following formula 1

$$O=255*(I/255)\hat{\ }n,$$

where I is an input value specified in the range of 0 to 255, n is a gamma value (n is an adjustment value), and O is an output value specified in the range of 0 to 255.

From the formula 1, the adjusted output value (O) with respect to the input value (I) is obtained using the adjustment value (n). In the case of using the formula 1, the input value and the output value are equal if any one of the configuration values of the lattice point is 255, so excessive adjustment is prevented.

In step S308, the adjustment table generation unit 204 stores the output values of the current lattice point of the through 3D LUT 501 stored in the RAM 103 by overwriting the previously stored values, and the processing proceeds to step S309.

In step S309, the adjustment table generation unit 204 checks whether all the lattice points of the through 3D LUT 501 are processed. If not all the lattice points are processed (NO in step S309), the processing proceeds to step S310.

In step S310, the lattice point positions and output values of the next lattice point of the through 3D LUT 501 stored in the RAM 103 are acquired, and the processing proceeds to step S304 to repeat the process.

On the other hand, in step S309, the adjustment table generation unit 204 checks whether all the lattice points of the through 3D LUT 501 are processed, and if all the lattice points are processed (YES in step S309), the processing proceeds to step S311.

In step S311, the adjusted through 3D LUT 501 stored in the RAM 103 is stored as an adjustment 3D LUT 502 in the RAM 103 or the external storage device 104. Then, the process ends.

By the process illustrated in FIG. 3, the 3D LUT is generated with which pixels included in the input image data to be processed and having the configuration values at least one of which is the maximum value or the minimum value are adjustable.

Specifically, a pixel that is included in the input image data represented by colors of the RGB color space and has the configuration values (R, G, B) at least one of which is the maximum value of 255 or the minimum value of 0 is adjusted.

FIG. 5B illustrates an example of the adjustment 3D LUT 502. The output values (R, G, B) corresponding to the configuration values (R, G, B) corresponding to the respective lattice points are specified, and some of the cases of the lattice points of numbers (No.) 0 to 4095 are specified. In comparison with FIG. 5A, the output values of some of the lattice points are adjusted.

While the example in which the gamma adjustment expressed by the formula 1 is used to adjust the through 3D LUT is described in the present exemplary embodiment, the present exemplary embodiment is not limited the method using the formula 1, and a different method can be used to adjust the through 3D LUT. For example, linear adjustment can be performed to multiply a pixel value by 0.800, 0.900, or 1.000 when the adjustment setting value is "−2", "−1", or "0", respectively.

Further, while the process of generating the adjustment 3D LUT is described in the present exemplary embodiment, the present exemplary embodiment is not limited to the process. Adjustment 3D LUTs can be prepared in advance for the respective setting values specified on the setting value selection screen 401, and the adjustment 3D LUTs can be switched when the setting value is set.

Figure 8:
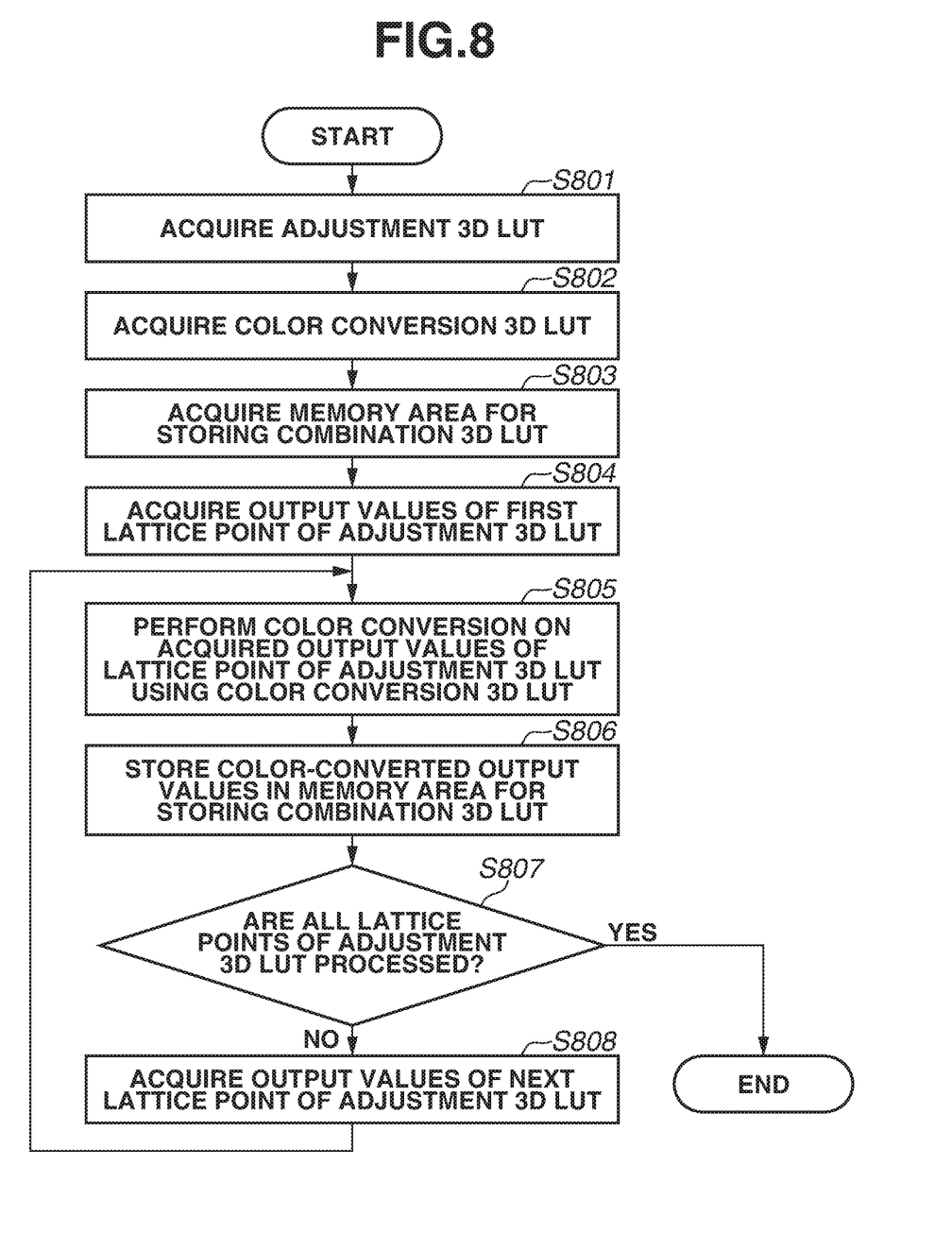
FIG. 8 is a flowchart illustrating a process of generating a combination 3D LUT according to the exemplary embodiment.

FIG. 8 illustrates an example of a process in which an RGB-input CMYK-output combination 3D LUT for use in the color conversion processing unit 211 is generated by the color conversion table combination unit 205. The CPU 101 reads a program stored in the ROM 102 into the RAM 103 and executes the program to realize the steps in the flowchart illustrated in FIG. 8 on the image formation apparatus 100.

When the adjustment table generation unit 204 finishes generating the adjustment 3D LUT 502, then in step S801, the color conversion table combination unit 205 acquires the adjustment 3D LUT 502 generated by the adjustment table generation unit 204, and the processing proceeds to step S802.

In step S802, the color conversion table combination unit 205 acquires an RGB-input CMYK-output color conversion 3D LUT 901 illustrated in FIG. 9A, and the processing proceeds to step S803.

In step S803, the color conversion table combination unit 205 acquires a memory area for storing the combination 3D LUT in the RAM 103, and the processing proceeds to step S804.

In step S804, the color conversion table combination unit 205 acquires the output values of the first lattice point of the adjustment 3D LUT 502, and the processing proceeds to step S805.

In step S805, the color conversion table combination unit 205 performs color conversion on the output values acquired in step S804 using the color conversion 3D LUT 901 acquired in step S802 to acquire color-converted output values, and the processing proceeds to step S806.

The 3D LUT 901 illustrated in FIG. 9A is an example of the color conversion 3D LUT. Output values (C, M, Y, K) corresponding to the configuration values (R, G, B) of the respective lattice point positions are specified. Each lattice point is given a number (No.), and some of the cases of the numbers 0 to 4095 are illustrated in FIG. 9A. The 3D LUT 901 is stored in advance in the RAM 103 or the external storage device 104.

For example, the 10th lattice point corresponding to the output values R, G, and B of "0", "0", and "170" in the adjustment 3D LUT 502 is the same as the 10th lattice point of the color conversion 3D LUT 901. The color-converted output values C, M, Y, and K of the lattice point of the above-specified RGB values are "217", "214", "39", and "28", respectively.

Further, the color conversion 3D LUT 901 does not include the same lattice point as the 3968th lattice point corresponding to the output values R, G, and B of "255", "124", and "0" in the adjustment 3D LUT 502. Thus, the output values C, M, Y, and K of the 3952nd and 3968th lattice points of the color conversion 3D LUT 901 are linearly interpolated to obtain the color-converted output values. Consequently, the output values C, M, Y, and K of the 3968th lattice point of the adjustment 3D LUT 502 are "0", "122", "246", and "0", respectively.

In step S806, the color conversion table combination unit 205 stores the color-converted output values in the memory area for storing the combination 3D LUT that is acquired in step S803, and the processing proceeds to step S807.

In step S807, the color conversion table combination unit 205 checks whether all the lattice points of the adjustment 3D LUT 502 are processed. If not all the lattice points are processed (NO in step S807), the processing proceeds to step S808.

In step S808, the color conversion table combination unit 205 acquires output values of the next lattice point of the adjustment 3D LUT 502, and the processing proceeds to step S805 to repeat the process.

On the other hand, in step S807, the color conversion table combination unit 205 checks whether all the lattice points of the adjustment 3D LUT 502 are processed, and if all the lattice points are processed (YES in step S807), the process ends.

In this way, a combination 3D LUT 902 is acquired. FIG. 9B illustrates an example of the combination 3D LUT 902. Output values (C, M, Y, K) corresponding to the configuration values (R, G, B) of the respective lattice point positions are specified. Each lattice point is given a number (No.), and some of the cases of the numbers 0 to 4095 are illustrated in FIG. 9B. The combination 3D LUT 902 is stored in the RAM 103 or the external storage device 104.

While the process of generating the combination 3D LUT is described in the present exemplary embodiment, the present exemplary embodiment is not limited to the process. Combination 3D LUTs can be prepared in advance for the respective setting values specified on the setting value selection screen 401, and the combination 3D LUTs can be switched.

When the color conversion table combination unit 205 finishes generating the combination 3D LUT 902, the color conversion processing unit 211 reads the combination 3D LUT 902 from the RAM 103 and performs color conversion processing on the image accepted by the image input unit 201.

By the process illustrated in FIG. 8, the adjustment 3D LUT 502 and the color conversion 3D LUT 901 are combined together to acquire the combination 3D LUT 902, which is a LUT for converting input RGB values into color-adjusted CMYK values. This enables conversion of the RGB values of the input image data into color-adjusted CMYK values.

According to the present exemplary embodiment, a pixel that is included in input image data to be processed and has configuration values at least one of which is the predetermined value (maximum value or minimum value) can be color-adjusted to be output.

Specifically, color adjustment is executable on characters and lines represented using primary colors (R, G, B, C, M, Y) and surrounding colors of the primary colors (e.g., gradations from C to W) including configuration values (R, G, B) at least one of which is the maximum or minimum value.

Accordingly, even if image data to be processed does not include information such as an attribute, characters and lines that are often represented using primary colors and surrounding colors of the primary colors in the image data can be color-adjusted and then be output.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-111362, filed Jun. 2, 2016, which is hereby incorporated by reference herein in its entirety.

What is claimed is:

1. An information processing apparatus comprising:
a memory device that stores a set of instructions; and
at least one processor that executes the set of instructions to:
store, in a storage, a first lookup table indicating each output color data associated with respective input color data, and
acquire a second lookup table by adjusting an output value of the first lookup table such that the output value is adjusted to be a color value for at least one of characters and lines,
wherein an input value of the input color data is represented by red (R), green (G), and blue (B) of an RGB color space,
wherein the output value to be adjusted in the first lookup table is an output value associated with an input value having a predetermined value corresponding to at least one of R, G, and B, and, the predetermined value includes at least a maximum value or a minimum value of color data, wherein the output value of the first lookup table is adjusted based on two configuration values among R, G, and B of the input value corresponding to the output value to be adjusted, and, the two configuration values are configuration values other than a configuration value of which the input value is the maximum value.

2. The information processing apparatus according to claim 1, wherein the first lookup table is a two- or higher-dimensional lookup table.

3. The information processing apparatus according to claim 1, wherein, in the first lookup table, the input value has a color value of an RGB color space, and the output color has a color value of the RGB color space.

4. The information processing apparatus according to claim 1, wherein an adjustment amount performed on the output value in the first lookup table is determined using the two configuration values of the input value other than a configuration value having the predetermined value and a preset setting value.

5. The information processing apparatus according to claim 1, wherein, in a case where there is a plurality of configuration values having the predetermined value.

6. The information processing apparatus according to claim 4, wherein, in a case of the input value includes first configuration values having the predetermined value and second configuration value having the predetermined value, the output value of the first lookup table is adjusted based on two configuration values other than the first configuration value.

7. The information processing apparatus according to claim 1, wherein a color of input image data is converted into a color of a CMYK color space using a color conversion table.

8. A method for controlling an information processing apparatus comprising:

storing, in a storage, a first lookup table indicating each output color data associated with respective input color data; and acquiring a second lookup table by adjusting an output value of the first lookup table such that the output value is adjusted to be a color value for at least one of characters and lines, wherein an input value of the input color data is represented by red (R), green (G), and blue (B) of an RGB color space, wherein the output value to be adjusted in the first lookup table is an output value associated with an input value having a predetermined value corresponding to at least one of R, G, and B, and, the predetermined value includes at least a maximum value or a minimum value of the color data, wherein the output value of the first lookup table is adjusted based on two configuration values among R, G, and B of the input value corresponding to the output value to be adjusted, and, the two configuration values are configuration values other than a configuration value of which the input value is the maximum value.

9. A non-transitory computer readable storage medium storing a program for causing a computer to execute a method for controlling an information processing apparatus, the method comprising:

storing, in a storage, a first lookup table indicating each output color data associated with respective input color data; and acquiring a second lookup table by adjusting an output value of the first lookup table such that the output value is adjusted to be a color value for at least one of characters and lines, wherein an input value of the input color data is represented by red (R), green (G), and blue (B) of an RGB color space, wherein the output value to be adjusted in the first lookup table is an output value associated with an input value having a predetermined value corresponding to at least one of R, G, and B, and, the predetermined value includes at least a maximum value or a minimum value of the color data, wherein the output value of the first lookup table is adjusted based on two configuration values among R, G, and B of the input value corresponding to the output value to be adjusted, and, the two configuration values are configuration values other than a configuration value of which the input value is the maximum value.

* * * * *